United States Patent
Simpson

[15] 3,644,789
[45] Feb. 22, 1972

[54] OVERCURRENT RELAYS

[72] Inventor: Michael Charles Stephen Simpson, Stafford, England

[73] Assignee: The English Electric Company Limited, London, England

[22] Filed: Aug. 5, 1968

[21] Appl. No.: 750,064

[30] Foreign Application Priority Data

Aug. 3, 1967 Great Britain..................35,634/67

[52] U.S. Cl............................317/36 TD, 317/38, 317/142
[51] Int. Cl..........................................................H01h 47/18
[58] Field of Search..........................317/36 TD, 142, 38

[56] References Cited

UNITED STATES PATENTS

| | | | |
|---|---|---|---|
| 3,127,542 | 3/1964 | Riebs | 317/36 X |
| 3,262,017 | 7/1966 | Ashenden et al. | 317/36 X |
| 3,317,791 | 5/1967 | Price et al. | 317/36 |
| 3,334,272 | 8/1967 | Lipnitz | 317/36 |

Primary Examiner—James D. Trammell
Attorney—Misegades & Douglas, Keith Misegades and George R. Douglas, Jr.

[57] ABSTRACT

This invention relates to an overcurrent relay in which a voltage is developed proportional to the current in an AC circuit, a two-state switch is responsive to an overcurrent condition in which the monitored voltage periodically exceeds a reference level whereby to assume one state for the duration of these periods during which this level is exceeded, a storage circuit progressively accumulates a voltage from a datum level during each period for which the switch is in its other state, and a timer is operable whenever the switch assumes its one state to actuate an output device after a predetermined delay, the timer being reset by the storage circuit each time its voltage attains a predetermined magnitude.

The maximum "overshoot" of the relay, i.e., the effect which could cause the output device to operate and effect protective action even with an unsustained overcurrent, may be contained within a period just in excess of one cycle, or even less, and the pickup/dropoff ratio of the output device can practically approach the optimum value of 100 percent.

11 Claims, 8 Drawing Figures

OVERCURRENT RELAYS

This invention relates to a protective relay responsive to an overcurrent in an AC circuit, and in particular relates to definite time overcurrent relays, i.e., relays in which a predetermined period is allowed to elapse between the instants at which an overcurrent is sensed and protective action taken.

According to the present invention there is provided an overcurrent relay comprising monitoring means for developing a voltage proportional to the current in an AC circuit, a two-state switch responsive to an overcurrent condition in which the monitored voltage periodically exceeds a reference level whereby to assume one state for the duration of these periods during which this level is exceeded, a storage circuit operable progressively to accumulate a voltage from datum level during each period for which the switch is in its other state, and a timing circuit operable whenever said switch assumes its one state to actuate an output device after a predetermined delay and which is reset by the storage circuit each time its voltage attains a predetermined magnitude, the arrangement being such that the stored voltage attains said magnitude in a period not less than that between succeeding instants at which the monitored voltage exceeds the reference level during an overcurrent.

Preferably, an auxiliary circuit is provided for instantaneously operating the output device, bypassing the timing circuit, in response to a substantial voltage being developed by the monitoring means and which is indicative of an overcurrent of excessive magnitude.

The relay may readily be connected for operation on single phase or multiphase systems and may also include earth fault protection, the monitoring means, e.g., current, or voltage, transformers and associated diodes, being designed appropriately. Furthermore, the relay may be made voltage sensitive, that is, the aforesaid reference level may vary in direct proportion to the voltage subsisting in the AC circuit.

A relay according to this invention provides in a simple and efficient manner adequate protection against excessive currents damaging electrical apparatus and systems and is yet relatively insensitive to transient overcurrents. The maximum degree of "overshoot" i.e., the effect which could cause the output device to operate and effect protective action even with an unsustained overcurrent, may conveniently be contained within a period just in excess of one cycle or even less depending on the complexity of the monitoring means, i.e., whether half-wave or full-wave diode bridges are employed.

The pickup/dropoff ratio of the output device can practically approach the optimum value of 100 percent and this value can be consistent between single phase and balanced multiphase faults depending on the construction and loading of the transformers in the monitoring means. In addition, the design of the timing circuit is such as to impose a low-standing direct current drain on the relay and the complexity of the settings is minimized by circuit design; this is particularly true in respect of the auxiliary (instantaneous) circuit where its threshold of operation is determined by a single variable resistor which may conveniently be calibrated directly in amperes.

In order that the invention may be fully understood, one embodiment thereof will now be described with reference to the accompanying drawings, in which.

With reference to the block diagram, the relay comprises an overcurrent starter 4 which is connected to receive a signal representative of the instantaneous current monitored from the protected section of, say, a power line and is operative to actuate a timer 5 in response to an overcurrent. This timer is activated continuously in the event of the overcurrent persisting over successive cycles and an output relay 6, e.g., a hinged armature e/m relay, is then subsequently operative to isolate the line in dependence on the delay occasioned by the timer.

In addition, an instantaneous "highset" unit 7 is provided for protecting the line in the event of an abnormal overcurrent, this unit functioning to bypass the timer and actuate directly the output relay 6.

Figure 2:
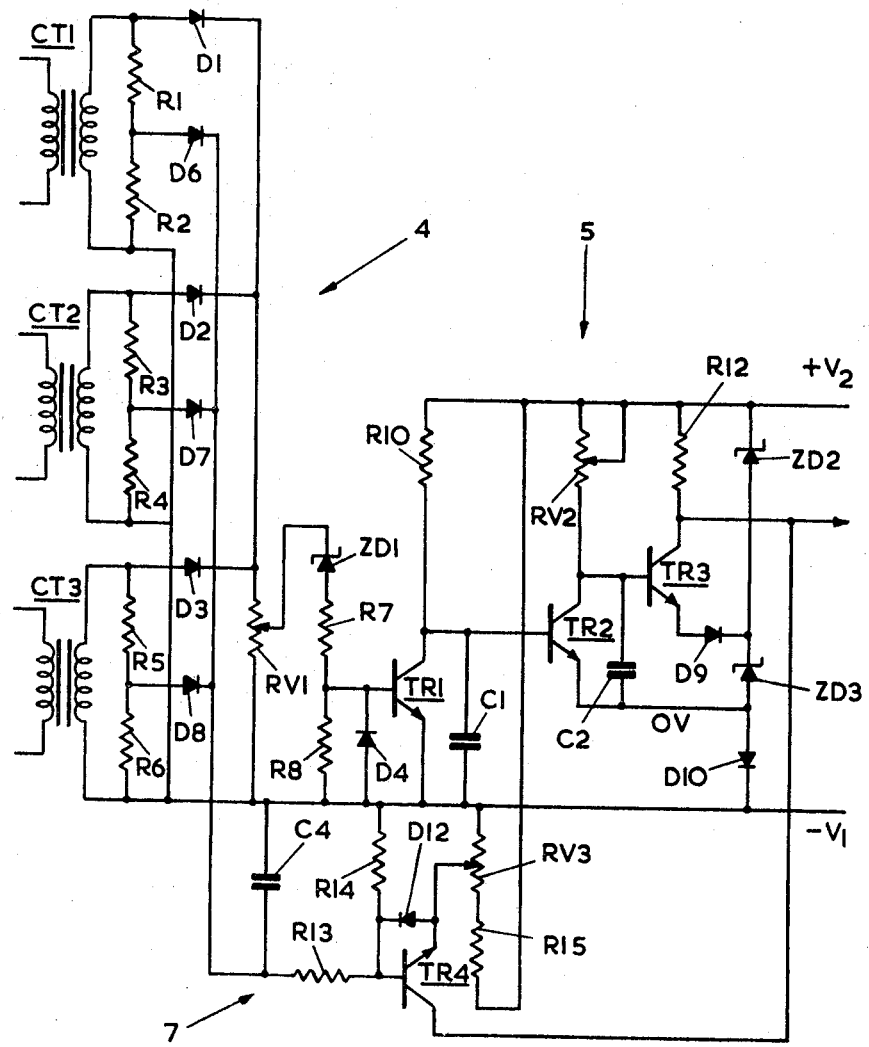
FIG. 2 is a detailed circuit diagram of the starter, the timer and the instantaneous "highset" unit in the above relay.

Referring now to FIG. 2, the overcurrent starter 4, the timer 5 and the instantaneous unit 7 are shown in more detail, the system being designed to detect overcurrents occurring in a three-phase power supply line.

In particular, current transformers CT1–CT3 in the overcurrent starter are associated with each phase and develop across their corresponding secondary resistors R1, R2–R5, R6 a voltage proportional to the input current through these resistors. Three like poled diodes D1–D3 are connected together from the secondaries to a potentiometer RV1 which lies in common across these circuits and the wiper arm of this potentiometer is connected to a zener diode ZD1 in series with two resistors R7, R8. The junction between these resistors is connected to the base electrode of a transistor TR1 having a limiting diode D4 connected across its base-emitter junction and a capacitor C1 connected across its collector-emitter path. The collector supply potential for this transistor is applied through a resistor R10 and the collector output is applied to the base of a further transistor TR2. This latter transistor has a variable resistor RV2 in its collector circuit and its output actuates the timer 5.

Figure 1:
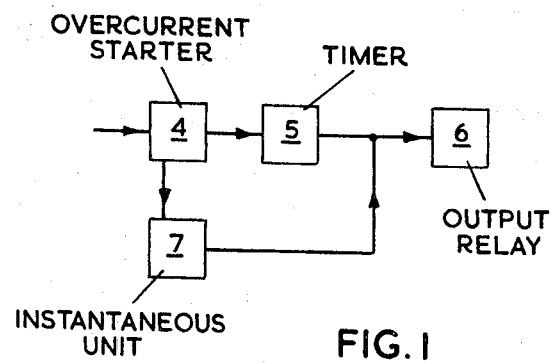
FIG. 1 is a block diagram of an overcurrent relay according to this invention.

In particular, the timer comprises a capacitor C2 connected directly across the collector-emitter path of the transistor TR2, the output from this transistor being applied to the base of a transistor TR3. The emitter circuit of TR3 includes a diode D9 which is connected to the junction between two voltage-regulating zener diodes ZD2, ZD3 which, in turn, are series connected across the supply with a diode D10. A resistor R12 is connected in the collector circuit of this transistor and its output actuates the relay 6 (FIG. 1).

With regard to the instantaneous unit, three like poled diodes D6–D8 are respectively connected to the junctions of the resistors R1, R2–R5, R6 and are coupled together to a smoothing capacitor C4, the part-smoothed output being applied to the base electrode of a transistor TR4 through a resistor R13 of a divider chain R13, R14. A protective diode D12 is connected across the base-emitter junctions of this transistor and the emitter is held at a potential determined by a potentiometer RV3 and a series resistor R15 connected to the supply line. The output from the transistor TR4 actuates the relay 6 directly.

In operation, under normal load conditions transistor TR2 is biassed-on drawing base current through R10 with capacitor C1 charged, and transistor TR1 is off, the voltage on the wiper arm of RV1 being less than the zener voltage $V_{z1}$ of the diode ZD1. In the event of an overcurrent now occurring in any one phase at, say, instant $t'$ (FIG. 3A) the following positive half cycle which is conducted by the appropriate diode D1–D3 breaks down the zener diode over the peak of its excursion so that a current pulse (FIG. 3B) flows into the base of transistor TR1, turning it on. With TR1 on, the capacitor C1 is discharged (FIG. 3C) causing the base of TR2 to go negative and thus biassing it off. The collector voltage of TR2 then rises with a time constant determined by RV2, C2 (FIG. 3D) in the timer circuit and in the event of the voltage across C2 exceeding the zener voltage of ZD3 transistor TR3 conducts and actuates the output relay.

The transistor TR1 in the starter is on for the duration of the period for which the zener diode ZD1 is conductive, and following this its collector voltage rises (FIG. 3C) at a rate determined by the time constant R10, C1. Should the overcurrent persist over the next input cycle then transistor TR1 is rendered conductive again before its collector voltage exceeds the emitter voltage (0 volts) of transistor TR2 so that this transistor is still maintained in the off state and the timer continues to operate.

Figure 3:
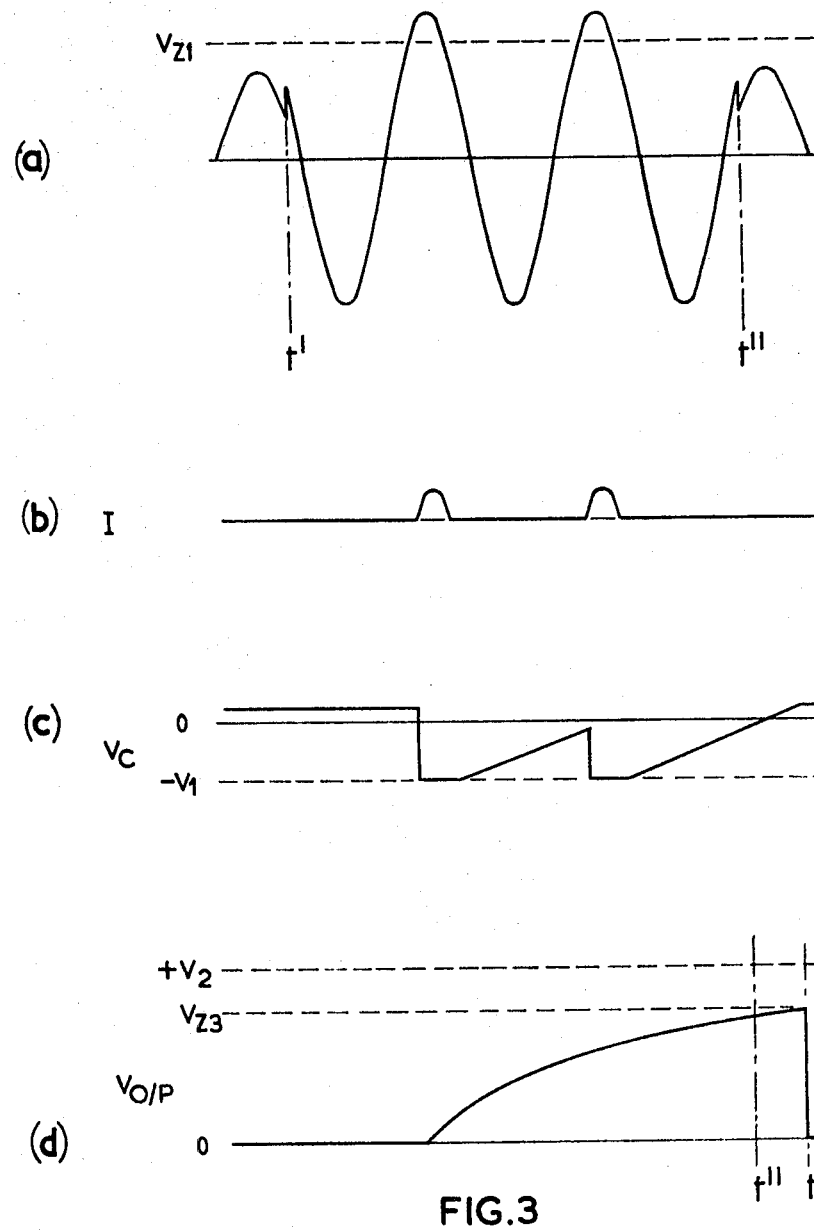
FIGS. 3A to 3D are waveform diagrams illustrating the mode of operation of the starter for one phase of a three-phase system.

If, as in the example given, the overcurrent ceases at an instant $t''$ then the capacitor C1 is permitted to continue charging and transistor TR2 is ultimately switched-on discharging the capacitor C2 and arresting the timer at the instant $t'''$ (FIG. 3D). The "overshoot" or reset time in this instance, i.e., the time for which the timer continues to operate following the cessation of the overcurrent and perhaps activate the output relay, is given by the period between $t''$ and $t'''$ and it will be evident that this is governed by R10, C1 and, at its maximum, need only just exceed the duration of one cycle irrespective of the magnitude of the overcurrent to which the starter is operable to respond, as set by RV1.

With abnormal and excessive overcurrents however, the instantaneous unit 7 is designed to respond immediately in dependence on the setting of RV3. In particular, the voltages developed across R2, R4 and R6 are half-wave rectified by the appropriate diodes D6–D8 and smoothed before application to the base of transistor TR4. If at any instant the base voltage on this transistor exceeds the emitter voltage, determined by the wiper arm of RV3, then this transistor will conduct and directly activate the output relay 6, bypassing the timer unit so as immediately to trip-out the protected powerline.

Should the overcurrent affect more than one phase then the action of the circuit will be similar except that there will be more current impulses (FIG. 3B) with a consequent decrease in the intermediate amplitudes of the voltage across C1 (FIG. 3C). The overshoot time will be unaffected, but this may conveniently be reduced by employing full-wave rectifier bridges instead of the half wave diodes D1–D3 the current impulses then occurring with twice the regularity shown; in this event the time constant R10, C1 can be halved resulting in a reduction by half in the overshoot time. A similar reduction will occur in the instantaneous operating time with the use of full-wave rectifiers for the diodes D6–D8.

Figure 4:
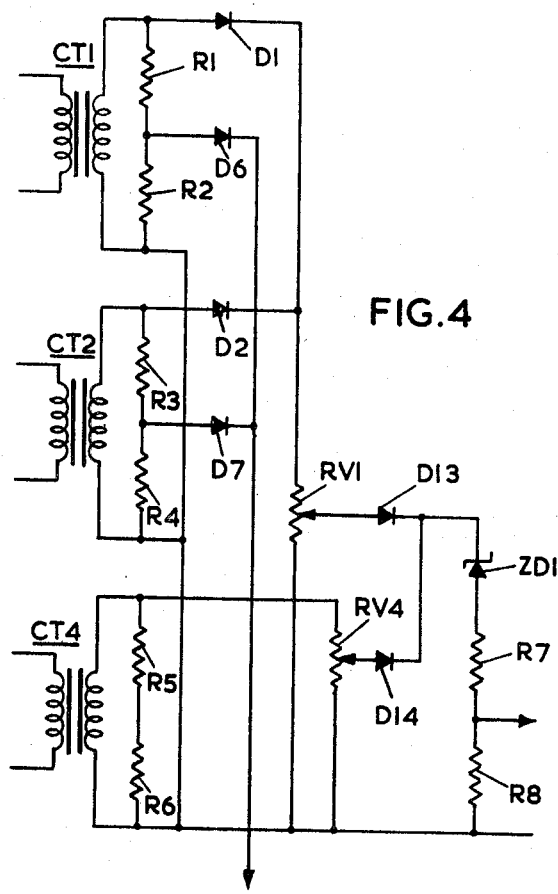
FIG. 4 shows an alternative input circuit to that employed in FIG. 2.

Although the invention has been described above in relation to protection of a three phase power supply line it is to be understood that the circuit is equally applicable for protecting other systems or apparatus, e.g., generator-transformer equipment. Furthermore, the input circuit may readily be simplified for protecting single-phase systems and protection may also be afforded for two-phase and earth fault operation of a three-phase system. In this latter instance the input circuit would be modified as shown in FIG. 4. In particular, in this Figure like components to those shown in FIG. 2 have been accorded the same reference numerals and the only changes involve the substitution of an earth fault current transformer CT4 for the phase transformer CT3, the provision of a separate variable resistor RV4 across the secondary of CT4 and the use of two isolating diodes D13, D14 in the leads from RV1 and RV4.

Figure 5:
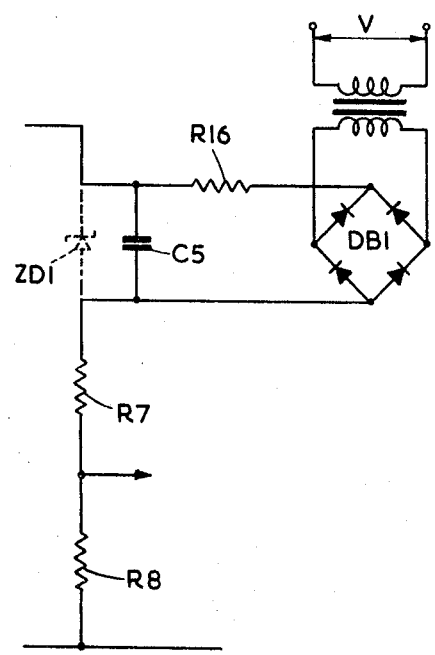
FIG. 5 shows a modified input circuit for rendering the relay voltage sensitive.

A further modification involves making the relay voltage sensitive. In this instance the input circuit is modified as shown in FIG. 5, the zener diode ZD1 (shown dotted) being replaced by a circuit for providing a "bias" voltage proportional to the voltage V subsisting in the AC system protected, namely, a full-wave diode bridge rectifier DB1 and a smoothing circuit R16, C5. Transistor TR1 thus turns on only when the instantaneous value of the current-dependent input voltage exceeds this "bias" voltage.

Although reference has been made throughout to the use of current transformers in the input circuit, voltage transformers may alternatively be used if the input quantity monitored is voltage.

I claim:

1. A definite time protective relay comprising;
   monitoring means for monitoring at least one alternating quantity in an AC circuit to be protected and producing a peak excess signal whenever a monitored quantity exceeds a predetermined level;
   a first delay circuit fed by the peak excess signals and which produces an output for the duration of and for a predetermined time (in excess of the maximum interval between successive peak excess signals due to a sustained fault) after the end of an input signal; and
   a second delay circuit fed with the output of the first delay circuit and which produces an output indicating a fault if the input to it exceeds a predetermined duration.

2. A definite time protective relay according to claim 1, wherein the first delay circuit includes a capacitor which is charged to a first state by an input signal and towards a second state when no input signal is present, the circuit producing an output signal when the capacitor is not in the first state.

3. A definite time protective relay according to claim 2, wherein the first delay circuit includes a transistor which is turned on by an input signal and is connected to charge the capacitor to the first state when turned on.

4. A definite time protective relay according to claim 1, wherein the second delay circuit includes a capacitor which is normally held in a first state and is charged towards a second state while an input signal is present, the circuit producing an output signal when the capacitor reaches the second state.

5. A definite time protective relay according to claim 4, wherein the second delay circuit includes a transistor which is turned off by an input signal and is connected to charge the capacitor to the first state when turned on.

6. A definite time protective relay according to claim 5, wherein the second delay circuit includes a voltage-responsive element subjected to the voltage on the capacitor in the second delay circuit and adapted to break down and produce an output signal in response to this voltage attaining a preset level.

7. A definite time protective relay according to claim 1, including also an auxiliary circuit fed by the monitoring means and operable to produce an output signal indicating a fault substantially instantaneously if the monitored quantity is of a magnitude indicating an excessive fault condition.

8. A definite time protective relay according to claim 1, including:
   a current transformer having a primary winding connected in the AC circuit and a secondary winding;
   rectifying means connected to the secondary winding of the transformer for producing a rectified waveform of the derived voltage; and
   a voltage-responsive element fed by the rectifying means and adapted to breakdown and produce a peak excess signal in response to the rectified waveform exceeding the said predetermined level.

9. A definite time protective relay according to claim 1, including:
   a current transformer having a primary winding connected in the AC circuit and a secondary winding;
   rectifying means connected to the secondary winding of the transformer for producing a rectified waveform of the derived voltage; and
   a sensing circuit fed by the rectifying means and operable to develop a DC bias voltage, proportional to the voltage subsisting in the AC circuit, which serves as the said predetermined level, and to produce a peak excess signal in response to the rectified waveform exceeding the said predetermined level.

10. A definite time protective relay according to claim 8, adapted for multiphase operation, the current transformers and rectifying means corresponding in number to the number of phases and being connected in common to the voltage responsive element.

11. The invention according to claim 1, wherein said monitoring means produces a peak excess signal whenever a monitored quantity instantaneously exceeds a predetermined level.

* * * * *